US012495056B1

United States Patent
Yueh et al.

(10) Patent No.: US 12,495,056 B1
(45) Date of Patent: Dec. 9, 2025

(54) SCANNING OF SECURITY LOGS TO DETECT DATA INDICATIVE OF CYBER THREATS

(71) Applicant: Trend Micro Incorporated, Shibuya-ku (JP)

(72) Inventors: Peng-Yuan Yueh, Taipei (TW); Josefino IV Fajilago, Pasig (PH); Chi-Yang Tsai, Taipei (TW); Ming-Chin Zhuang, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 143 days.

(21) Appl. No.: 18/487,493

(22) Filed: Oct. 16, 2023

(51) Int. Cl.
    *H04L 9/40* (2022.01)
(52) U.S. Cl.
    CPC ...... H04L 63/1425 (2013.01); H04L 63/1416 (2013.01)
(58) Field of Classification Search
    CPC . H04L 63/20; H04L 63/1425; H04L 63/1416; H04L 63/0236; G06F 21/552; G06F 21/557
    See application file for complete search history.

(56) References Cited

U.S. PATENT DOCUMENTS

| | | | | |
|---|---|---|---|---|
| 7,523,493 B2* | 4/2009 | Liang | ...................... | H04L 63/20 726/13 |
| 10,061,918 B2* | 8/2018 | Sultana | ................. | G06F 12/145 |
| 10,367,834 B2* | 7/2019 | Sweet | ................. | H04L 63/1433 |
| 10,917,417 B2* | 2/2021 | Wang | ................... | H04L 63/1408 |
| 11,528,294 B2* | 12/2022 | Bargnesi | ............. | H04L 63/0263 |
| 11,611,591 B2* | 3/2023 | Parekh | ................ | H04L 63/1425 |
| 11,824,875 B2* | 11/2023 | Moore | ................ | H04L 63/1466 |
| 11,962,620 B2* | 4/2024 | Parekh | .................. | G06F 3/0483 |
| 12,113,771 B2* | 10/2024 | Fenton | ................ | H04L 63/1425 |
| 2023/0095306 A1* | 3/2023 | Fenton | ................ | H04L 63/0236 726/13 |

OTHER PUBLICATIONS

"Detection Model Management", Trend Micro: Online Help Center, Downloaded Sep. 13, 2023, https://docs.trendmicro.com/en-us/enterprise/trend-vision-one/xdr-part/detection-model-mana.aspx.
"What Are XDR Security Analytics?", Trend Micro, Downloaded Sep. 13, 2023, in https://www.trendmicro.com/en_us/what-is/xdr/security-analytics.html.

* cited by examiner

*Primary Examiner* — Hosuk Song
(74) *Attorney, Agent, or Firm* — Beyer Law Group LLP

(57) ABSTRACT

Filters that include matching criteria for detecting data indicative of attack techniques of cyber threats are provided in a repository. Filters that meet filter conditions of a rule of a heuristic model are automatically included in the rule. Filters that have been automatically included in the rule by having met the filter conditions of the rule are automatically removed from the rule when the filters no longer meet the filter conditions of the rule. A security log is scanned for data that meet matching criteria of filters included in the rule. The heuristic model issues an alert at least in response to detecting that the security log includes data that meet matching criteria of filters included in the rule.

14 Claims, 16 Drawing Sheets

133-1

```
0000 title: Powershell Accessing Lsass
0001 description: Harvesting of password hashes by reading
lsass
0002 tags:
0003     - mitre.t1059.001
0004     - mitre.t1003.001
0005     - mitre.t1003
0006 logsource:
0007     product: windows
0008     definition: TELEMETRY_PROCESS
0009 detection:
0010     selection:
0011         eventSubId: TELEMETRY_PROCESS_OPEN
0012         objectFilePath:
0013             - '*lsass.exe*'
0014     processPath:
0015         processFilePath:
0016             - '*powershell.exe*'
0017     condition: selection and processPath
0018 falsepositives:
0019     - likely
0020 level: medium
0021 id: b8fda3a0-844b-420f-8758-0cbebd14b038
0022 highlightedobjects:
0023     - type: command_line
0024       field: parentCmd
0025       riskLevel: low
0026     - type: command_line
0027       field: processCmd
0028       master: true
0029     - type: process_id
0030       field: processPid
0031       riskLevel: low
0032     - type: command_line
0033       field: objectCmd
0034       riskLevel: low
0035 tmproducts:
0036     - sao
0037     - sds
0038     - xes
```

```
0000 {
0001   "processFileHashSha256":
"de96a6e69944335375dc1ac238336066889d9ffc7d73628ef4fe1b1b160ab32c",
0002   "eventSubId": "TELEMETRY_PROCESS_OPEN",
0003   "objectTrueType": 7,
0004   "processFileSize": "448000",
0005   "objectSessionId": 0,
0006   "parentFilePath": "C:\\Windows\\System32\\svchost.exe",
0007   "eventSourceType": "EVENT_SOURCE_TELEMETRY",
0008   "tags": [
0009     "MITRE.T1003",
0010     "MITRE.T1003.001",
0011     "MITRE.T1059.001",
0012     "XSAE.F2288"
0013   ],
0014   "parentName": "C:\\Windows\\System32\\svchost.exe",
0015   "objectUser": "SYSTEM",
0016   "objectCmd": "C:\\Windows\\system32\\lsass.exe",
0017   "parentCmd": "C:\\Windows\\system32\\svchost.exe -k netsvcs -p -s Schedule",
0018   "sinkTime": 1694665124681,
0019   "eventTime": "1694665078157",
0020   "processCmd": "\"powershell.exe\" D:\\RDPUsage\\LogTaskMgr.ps1",
0021   "uuid": "32766968-1341-4309-be01-518fa4053219",
0022   "processName": "C:\\Windows\\System32\\WindowsPowerShell\\v1.0\\powershell.exe",
0023   "filterRiskLevel": "medium",
0024   "eventId": "TELEMETRY_PROCESS",
0025   "objectFilePath": "C:\\Windows\\System32\\lsass.exe",
0026   "objectSigner": [
0027     "Microsoft Windows Publisher"
0028   ],
0029   "processPid": 4836,
0030   "parentSigner": [
0031     "Microsoft Windows Publisher"
0032   ],
0033   "tmFilterRiskLevel": "medium",
0034   "parentPid": 2380,
0035   "objectSignerValid": [
0036     true
0037   ],
0038   "objectName": "C:\\Windows\\System32\\lsass.exe",
0039   "parentUser": "SYSTEM",
0040 }
```

FIG. 3

```
0000 {
0001   "id": "452ae679-33e0-433a-b715-f10e21bcb684",
0002   "name": "[Heuristic Attribute] Highly Suspicious Credential Dumping
Attack via Registry",
0003   "description": "Detects Highly Suspicious Credential Dumping Attack
via Registry Attack based on Mitre Technique",
0004   "filterSets": [
0005     [
0006       {
0007         "id": "eefb976a-13dd-4d08-b289-3c1ef4b38a78",
0008         "condition": {
0009           "tags": [
0010             "mitre.t1036.005"
0011           ],
0012           "level": [
0013             "critical",
0014             "high",
0015             "medium",
0016             "low"
0017           ]
0018         },
0019         "exemption": {
0020           "tags": [
0021             "bas.tmdemokit"
0022           ]
0023         },
0024         "highlight": true
0025       },
0026       {
0027         "id": "b08c005a-95e5-4e3d-9ba2-b451f2610496",
0028         "name": "Registry Key Creation for Shim Database",
0029         "highlight": true
0030       }
0031     ]
0032   ],
0033   "threshold": {
0034     "targetOccurrence": 1,
0035     "withinSeconds": 43200,
0036     "dedupSeconds": 43200
0037   },
0038   "requiredProducts": [
0039     [
0040       "sao",
0041       "sds",
0042       "xes"
0043     ]
0044   ]
0045 }
```

```
0000 title: Registry Key Creation For Shim Database
0001 description: Creation Or Modification Of Registry Key For Shim
Database
0002 tags:
0003     - mitre.t1112
0004     - mitre.t1546.011
0005 logsource:
0006     product: windows
0007     definition: TELEMETRY_REGISTRY
0008 detection:
0009     subid:
0010         eventSubId:
0011             - TELEMETRY_REGISTRY_CREATE
0012             - TELEMETRY_REGISTRY_SET
0013     selection1:
0014         objectRegistryKeyHandle:
0015             - '*\software\microsoft\windows nt\currentversion\
appcompatflags\installedsdb'
0016             - '*\software\microsoft\windows nt\currentversion\
appcompatflags\installedsdb\\*'
0017         objectRegistryValue:
0018             - '*databasepath*'
0019     selection2:
0020         objectRegistryKeyHandle:
0021             - '*\software\microsoft\windows nt\currentversion\
appcompatflags\custom'
0022             - '*\software\microsoft\windows nt\currentversion\
appcompatflags\custom\\*'
0023     condition: subid and (selection1 or selection2)
0024 falsepositives:
0025     - likely
0026 level: medium
0027 id: b08c005a-95e5-4e3d-9ba2-b451f2610496
0028 displayid: F2344
0029 highlightedobjects:
0030     - type: registry_key
0031       field: objectRegistryKeyHandle
0032     - type: fullpath
0033       field: processFilePath
0034       riskLevel: low
0035     - type: command_line
0036       field: processCmd
0037       riskLevel: low
0038 tmproducts:
0039     - sao
0040     - sds
0041     - xes
```

```
0000 {
0001   "id": "f67adf2f-3087-428a-a789-bf184d59a8d4",
0002   "name": "[Heuristic Attribute] Low Prevalence File Execution",
0003   "description": "Detects Low Prevalence File Execution Technique",
0004   "filterSets": [
0005     [
0006       {
0007         "id": "01c4dc5c-f5d2-4553-befa-d239eaabfc78",
0008         "condition": {
0009           "tags": [
0010             "mitre.t1059"
0011           ],
0012           "prevalence": [
0013             "low"
0014           ]
0015         },
0016         "highlight": true
0017       }
0018     ]
0019   ],
0020   "threshold": {
0021     "targetOccurrence": 1,
0022     "withinSeconds": 1800,
0023     "dedupSeconds": 21600
0024   },
0025   "requiredProducts": [
0026     [
0027       "sao",
0028       "sds",
0029       "xes"
0030     ]
0031   ]
0032 }
```

```
0000 {
0001   "id": "16b8bc96-f784-4ef4-8d58-3a180e261121",
0002   "name": "[Heuristic Attribute] Highly Suspicious Credential Dumping Attack via Registry",
0003   "description": "Heuristic Detection of Highly Suspicious Credential Dumping Attack via Registry Modification",
0004   "riskLevel": "high",
0005   "scope": "endpoint",
0006   "rules": [
0007     {
0008       "id": "452ae679-33e0-433a-b715-f10e21bcb684",
0009       "name": "[Heuristic Attribute] Highly Suspicious Credential Dumping Attack via Registry",
0010       "score": 1
0011     }
0012   ],
0013   "threshold": {
0014     "targetScore": 1,
0015     "withinSeconds": 43200,
0016     "dedupSeconds": 43200
0017   },
0018   "requiredProducts": [
0019     [
0020       "sao",
0021       "sds",
0022       "xes"
0023     ]
0024   ],
0025   "tags": [
0026     "mitre.t1112",
0027     "mitre.t1036.005"
0028   ],
0029   "visibleLevel": 1,
0030   "globalModel": true,
0031   "silent": true
0032 }
```

FIG. 7

SCANNING OF SECURITY LOGS TO DETECT DATA INDICATIVE OF CYBER THREATS

TECHNICAL FIELD

The present disclosure is generally directed to cybersecurity, and more particularly but not exclusively to analysis of security logs.

BACKGROUND

Vast amounts of security events are detected by cybersecurity modules and recorded in security logs. These security events include detections of suspicious or malicious activities, operations, and/or objects indicative of cyber threats. Examples of cyber threats include unauthorized intrusion, phishing, ransomware attack, malicious data, etc.

A streaming security analytics engine (SAE), such as that in the Extended Detection and Response (XDR) service provided by Trend Micro Incorporated, may be employed to scan security logs for data indicative of cyber threats. The SAE includes a detection model that issues an alert when its rules are triggered by data in the security logs. More particularly, a rule includes a plurality of filters, with each filter having matching criteria that are used to scan security logs for data indicative of cyber threats. A filter highlights portions of a security log as displayed on a display screen when its matching criteria are met by data in the security log. A rule is triggered when a security log has data that meet the matching criteria of its filters.

A cyber threat comprises a plurality of attack techniques, with each attack technique being described by a filter. By organizing the filters into rules, and the rules into a detection model, the detection model is able to detect the cyber threat. However, the increasingly large amounts of data in security logs and the ever changing nature of cyber threats make it very difficult to keep detection models up-to-date.

BRIEF SUMMARY

In one embodiment, a method of scanning security logs for data indicative of cyber threats includes providing a plurality of filters, the plurality of filters comprising matching criteria for detecting data indicative of attack techniques of cyber threats. Filters of the plurality of filters that meet filter conditions of a rule of a heuristic model are automatically included in the rule. Filters that have been automatically included in the rule by meeting the filter conditions of the rule are automatically removed from the rule when the filters no longer meet the filter conditions of the rule. A security log is scanned for data that meet matching criteria of filters included in the rule. The heuristic model issues an alert at least in response to detecting that the security log includes data that meet matching criteria of filters included in the rule.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 2 shows an example filter for scanning a security log.

FIG. 3 shows an example security log.

FIG. 4 shows a rule, in accordance with an embodiment of the present invention.

FIG. 5 shows contents of a filter, in accordance with an embodiment of the present invention.

FIG. 6 shows a rule, in accordance with an embodiment of the present invention.

FIG. 7 shows a heuristic model, in accordance with an embodiment of the present invention.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
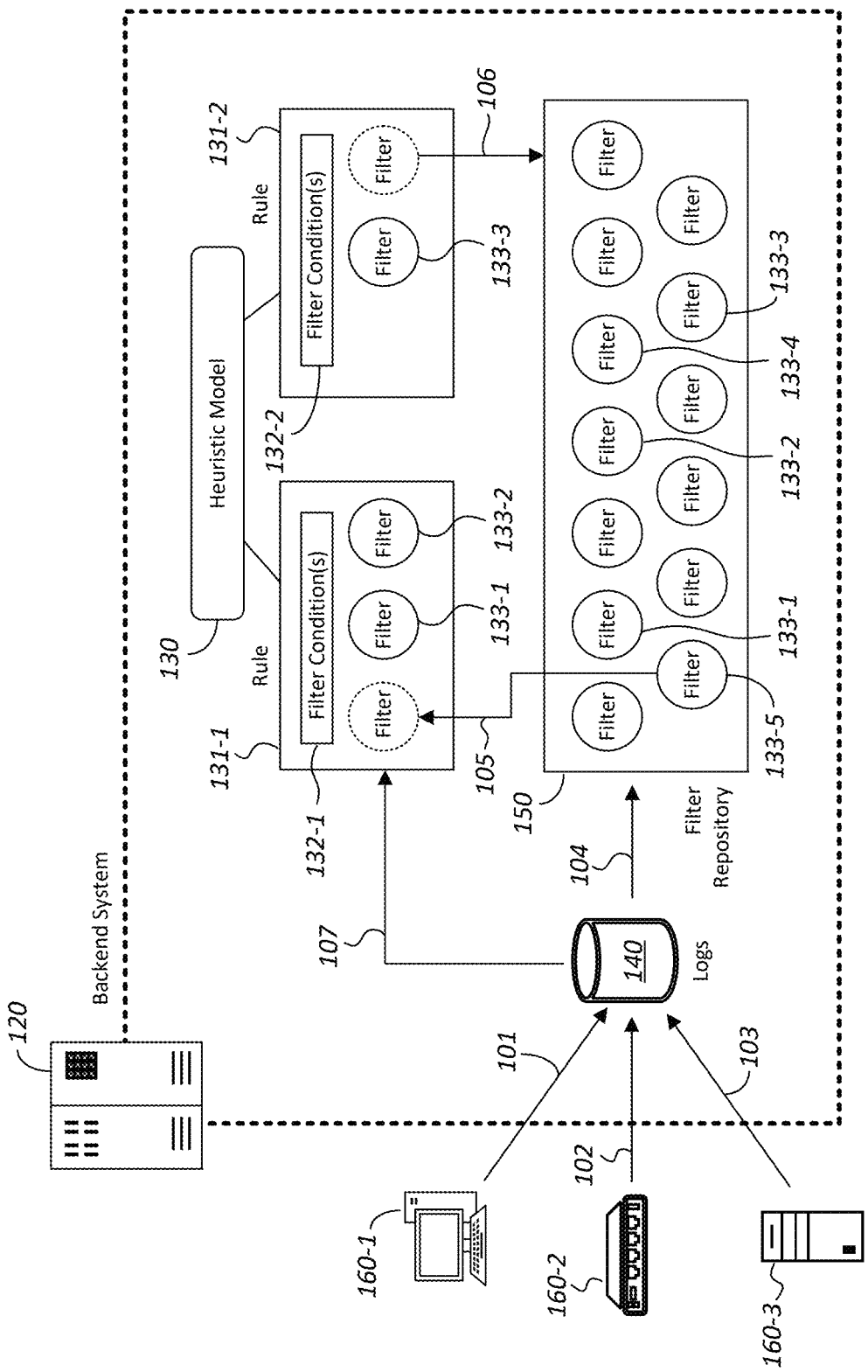
FIG. 1 shows a block diagram of a backend system for scanning security logs to detect data indicative of cyber threats, in accordance with an embodiment of the present invention.

FIG. 1 shows a block diagram of a backend system 120 for scanning security logs to detect data indicative of cyber threats, in accordance with an embodiment of the present invention. The backend system 120 may be implemented on a dedicated server computer system, on a cloud computing infrastructure of a cloud service provider (e.g., Amazon Web Services™), or other computer system. The backend system 120 may be maintained and operated by a cybersecurity vendor, such as Trend Micro Incorporated, as part of an XDR service.

The backend system 120 operates in conjunction with one or more security event sources 160 (i.e., 160-1, 160-2, 160-3, etc.). A security event source 160 is a computer system that is configured to provide a log of security events to the backend system 120. A security event source 160 may be an endpoint computer system that runs a cybersecurity module for detecting and recording detection of data indicative of cyber threats. A security event source 160 may also be a computer system that receives and compiles logs of security events from other computer systems. The security event sources 160 provide logs of security events to the backend system 120 (see arrows 101, 102, and 103) over the public Internet or other communication network. The backend system 120 includes storage space (e.g., hard drive, nonvolatile memory, cloud storage) for storing received logs of security events as security logs 140 and for storing other data of the backend system 120.

Filters 133 (i.e., 133-1, 133-2, 133-3, etc.) may be created based on data in the security logs 140 (see arrow 104). For example, cybersecurity experts may create the filters 133 by correlating data in the security logs 140 with other threat information. Cybersecurity experts may also create the filters 133 by machine learning, data stacking, or other conventional approaches to creating filters to detect an attack technique of a cyber threat. The filters 133 are stored in a filter repository 150 of the backend system 120.

Generally, a cyber threat comprises one or more attack techniques. An attack technique may exploit a particular vulnerability by performing a sequence of operations. Examples of attack techniques include remote code execution, escalation of privilege, cross-site request forgery, sql injection, command injection, server-side request forgery, etc. A cyber threat is detected when its attack techniques are detected.

Description of attack techniques has been standardized in the cybersecurity field, e.g., Mitre techniques. A filter 133 includes one or more matching criteria for scanning a security log for data indicative of a known attack technique. The matching criteria may indicate a particular security log, a file path of an object or a process, a tag of threat information, etc. A filter 133 is satisfied when its matching criteria are met by data in the security log, i.e., data indicative of an attack technique described by the filter are found in the security log. When satisfied, the filter 133 is configured to highlight (e.g., bold, underline, color) particular fields or portions of the security log to alert security personnel who review the security log on a display screen.

FIG. 2 shows an example filter 133-1 for scanning an example security log 220 shown in FIG. 3. In one embodiment, heuristic models, security logs, rules, and filters in the present disclosure, including the filter 133-1 and the security log 220, are in JavaScript Object Notation (JSON) format.

The filter 133-1 is for detecting an attack technique that reads the Local Security Authority Subsystem Service ("lsass") of the Microsoft Windows™ operating system as part of a cyber threat that harvests password hashes (FIG. 2, lines 0000-0001). The filter 133-1 includes matching criteria that include a particular file path of an object (FIG. 2, lines 0011-0013) and a particular process path (FIG. 2, lines 0014-0016) in security events pertaining to the Microsoft Windows™ operating system. When the matching criteria are met by data in a security log, the filter 133-1 is configured to highlight certain fields of the security log, such as "parentCmd", "processCmd", etc. (FIG. 2, lines 0022-0034).

In the example of FIG. 3, the security log 220 has data that meet the matching criteria of the example filter 133-1 of FIG. 2. More particularly, the security log 220 is from security events involving the Microsoft Windows™ operating system and have the object file path (FIG. 3, line 25) and process path (FIG. 3, line 22) indicated by the matching criteria of the filter 133-1. Accordingly, certain fields of the security log 220 are highlighted as per the filter 133-1, such as the "parentCmd" field (FIG. 3, line 0017), the "processCmd" field (FIG. 3, line 0020), etc. of the security log 220.

Referring back to FIG. 1, a heuristic model 130 is configured to detect a cyber threat, including variations of the cyber threat, from data of recorded security events in the security logs 140. The backend system 120 may maintain a plurality of heuristic models 130 to detect different cyber threats. To detect a cyber threat, a security log may be scanned for data that meet matching criteria of one or more filters 133 of one or more rules 131 (i.e., 131-1, 131-2, etc.) of a heuristic model 130.

A heuristic model 130 comprises one or more rules 131, with each rule 131 comprising one or more filters 133. A filter 133 may be hardcoded (i.e., manually entered by a cybersecurity expert) by specifically identifying the filter 133 by its assigned identifier (filter ID) to be included in the rule 131. In the example of FIG. 1, the rule 131-1 has the hardcoded filters 133-1 and 133-2, and the rule 131-2 has the hardcoded filter 133-3. The hardcoded filters 133 remain in their corresponding rule 131 until the rule 131 is modified. It is to be noted that the contents of a filter 133 do not need to be copied into a rule 131. More particularly, a filter 133 only needs to be referenced in a rule 131 by its filter ID (e.g., see FIG. 2, line 0021).

A filter condition 132 is a condition for automatically (i.e., by program control instead of manual entry) including a filter 133 in a rule 131. A filter 133 that meets the filter condition 132 of a rule 131 is automatically added to the rule 131, and is automatically removed from the rule 131 when it no longer meets the filter condition 132. In contrast to hard coding filters 133 in a rule 131, the filter conditions 132 may be used to allow for dynamic selection of filters 133 that will be part of the rule 131. In the example of FIG. 1, the filter 133-5 meets the filter conditions 132-1 of the rule 131-1, and is thus automatically added to the rule 131-1 (see arrow 105). Also in the example of FIG. 1, a filter 133 that was previously automatically added by the filter conditions 132-2 of the rule 131-2 is automatically removed from the rule 131-2 because it no longer meets the filter conditions 132-2 (see arrow 106).

A filter condition 132 may require a particular static attribute and/or dynamic attribute of a filter 133 as a condition for including the filter 133 in a rule 131. A static attribute of a filter 133 is a non-changing attribute of the filter 133. In one embodiment, the static attributes of a filter 133 include tags (e.g., Mitre technique version and ID, threat type, Common Vulnerabilities and Exposures (CVE) information; e.g., see FIG. 2, lines 0002-0005); log source (the operating system involved and source of the security event; e.g., FIG. 2, lines 0006-0007); cybersecurity vendor product (the security product that detects the security event; e.g., FIG. 2, lines 0035-0038); and security level (i.e., threat level of the attack technique; e.g., FIG. 2, line 0020).

In one embodiment, the dynamic attributes of a filter 133 include prevalence (e.g., the number customers/organizations with security logs that satisfy the filter 133 within a given time period); maturity (e.g., the number of days since the filter 133 was published); and hit count (the number of times the filter 133 has been satisfied within a given time period). The dynamic attributes of a filter 133 may be determined from data in the security logs 140 (see arrow 107). For example, the security logs 140 may be scanned to get a count of security events that satisfy a filter 133 to determine the hit count or prevalence of the filter 133.

The heuristic model 130 is configured to issue an alert when its rules 131 and its triggering conditions, if any, are triggered. Issuing the alert may include displaying a warning message on a display screen, sending a text message to security personnel, or other ways of alerting security personnel of detection of a possible cyber threat. The triggering conditions of the heuristic model 130 may be based on the particular rules 131 that have been triggered. For example, each rule 131 may be assigned a risk score. In that example, the heuristic model 130 may be configured to issue an alert when its rules 131 that have been triggered have risk scores that add up to exceed a predetermined risk threshold.

FIG. 4 shows a rule 131-3, in accordance with an embodiment of the present invention. In one embodiment, filters 133 may be grouped together as a filter set, and a rule 131 may have multiple filter sets. Filters 133 that are added or removed by a filter condition 132 are added to or removed from the filter set that includes the filter condition 132. Filters 133 in the same filter set are in a logical AND relationship, and different filter sets are in a logical OR relationship. More particularly a filter set is satisfied when all the filters 133 in the filter set are satisfied; a rule 131 is triggered when any of its filter sets is satisfied. As can be appreciated, filters 133 and/or filter sets may have different logical relationships depending on the particulars of the cybersecurity application.

In the example of FIG. 4, the rule 131-3 has a single filterset (FIG. 4, lines 0004-00032) for clarity of illustration, and filters 133 to be included in the filterset are in a logical AND relationship. The rule 131-3 may be identified by its rule ID (FIG. 4, line 0001). The rule 131-3 includes filter conditions 132-3 and 132-4. It is to be noted that the filter conditions 132-3 and 132-4 indicate static attributes of filters 133.

The filter condition 132-4 indicates a filter 133 by its filter ID, name, and highlight state (FIG. 4, lines 0027 to 0029). The filter 133 that is identified by the filter condition 132-4 is shown in FIG. 5 as a filter 133-6. Referring to FIG. 5, the filter identifier of the filter 133-6 (FIG. 5, line 0027) is referenced in the rule 131-3 (FIG. 4, line 0027). The title of the filter 133-6 (FIG. 5, line 0000) also matches the name of the filter 133-6 in the rule 131-3 (FIG. 4, line 0028).

Referring back to FIG. 4, the filter condition 132-3 requires that filters 133 to be added to the rule 131-3 have a "mitre.t1036.005" tag (FIG. 4, lines 0009-0010) and a security level of critical, high, medium, or low (FIG. 4, lines 0012-0017), except filters 133 that have a "bas.tmdemokit" tag (FIG. 4, lines 0019-0023). That is, filters 133 that have a "bas.tmdemokit" tag will never meet the matching criteria of the filter condition 132-3. Advantageously, rather than relying on filter IDs to add filters 133 to the rule 131-4, the filter condition 132-3 dynamically adds or removes one or more filters 133 depending on whether the filters 133 meet the condition.

A rule 131 may have general conditions that apply to the entire rule. In the example of FIG. 4, a general condition 136-1 requires that the filters 133 to be added to the rule 131-3 are used in the "sao", "sds", "xes" products of the cybersecurity vendor (FIG. 4, lines 0038-0044). A general condition 136-2 requires that the rule 131-3 is triggered at least once (FIG. 4, line 0034) within 43200 seconds (FIG. 4, line 0035). The "dedupSeconds" (deduplication seconds) suppresses multiple rule triggers. If the rule is 131-3 is triggered, further triggering of the rule 131-3 is suppressed in the following 43200 seconds (FIG. 4, line 0036).

FIG. 6 shows a rule 131-4, in accordance with an embodiment of the present invention. In the example of FIG. 6, a filter condition 132-5 indicates a dynamic attribute of a filter 133 to be added to the rule 131-4 (FIG. 6, lines 0012-0013). More particularly, the filter condition 132-5 requires a filter to have a "mitre.t1059" tag and a prevalence of "low". The "low" prevalence may be a predetermined range of hit counts of the filter 133. Generally, a high filter hit count is caused by environmental issues, and not pertinent detections. Setting the prevalence to "low" advantageously minimizes the number of unimportant alerts.

FIG. 7 shows a heuristic model 130-1 in accordance with an embodiment of the present invention. The heuristic model 130-1 has a single rule, which is the rule 131-3 of FIG. 4, for clarity of illustration. As can be appreciated, a heuristic model may have a plurality of rules. The rule 131-3 is referenced in the heuristic model 130-1 by its rule identifier (FIG. 7, line 0008).

In the example of FIG. 7, the rule 131-3 is assigned a risk score of "1". That is, 1 is added to the overall risk score of the heuristic model 130-1 when the rule 131-3 is triggered. The heuristic model 130-1 has triggering conditions that need to be met in order to trigger. In the example of FIG. 7, the heuristic model 130-1 requires an overall risk score of "1" (FIG. 7, line 0014) within the last 43200 seconds (FIG. 7, line 0015). Once triggered, further triggering of the heuristic model 130-1 in the next 43200 second is suppressed (FIG. 7, line 0016). The heuristic model 130-1 is triggered by log data of security events detected by particular products of the cybersecurity vendor (FIG. 7, lines 0018 to 0024).

A problem with currently-available detection models is that the number of security events detected by security event sources are constantly increasing, making it very difficult to select filters that are relevant for detecting cyber threats that increase in number and evolve over time. Manually selecting and entering particular filters in rules are also error prone. Worse, the maintenance of detection models becomes more complicated as filters are modified to keep up with changes in cyber threats. Embodiments of the present invention address these problems by dynamically adding or removing filters in rules of heuristic models.

It is to be noted that most XDR vendors are moving toward Hybrid or Open XDR. That means XDR services need to handle various kinds of logs, either vendor-native logs, logs from infrastructure, or even logs from third-party vendors. This creates a problem similar to a math dimension problem of N choose K, where the combination can get very big as K (the log source) increases. In essence, embodiments of the present invention reduce N from a big number (tens/hundreds of thousands) to something like the number of Mitre techniques, which is about 300. In this way, the dimension is reduced, and the dimension is mapped onto a common language (Mitre techniques expressed as filters).

Particular advantages and use cases of the embodiments are now explained with reference to FIGS. 8-12. It is to be noted that hardcoded filters 133 are not shown in the examples of FIGS. 8-12 for clarity of illustration.

Figure 8:
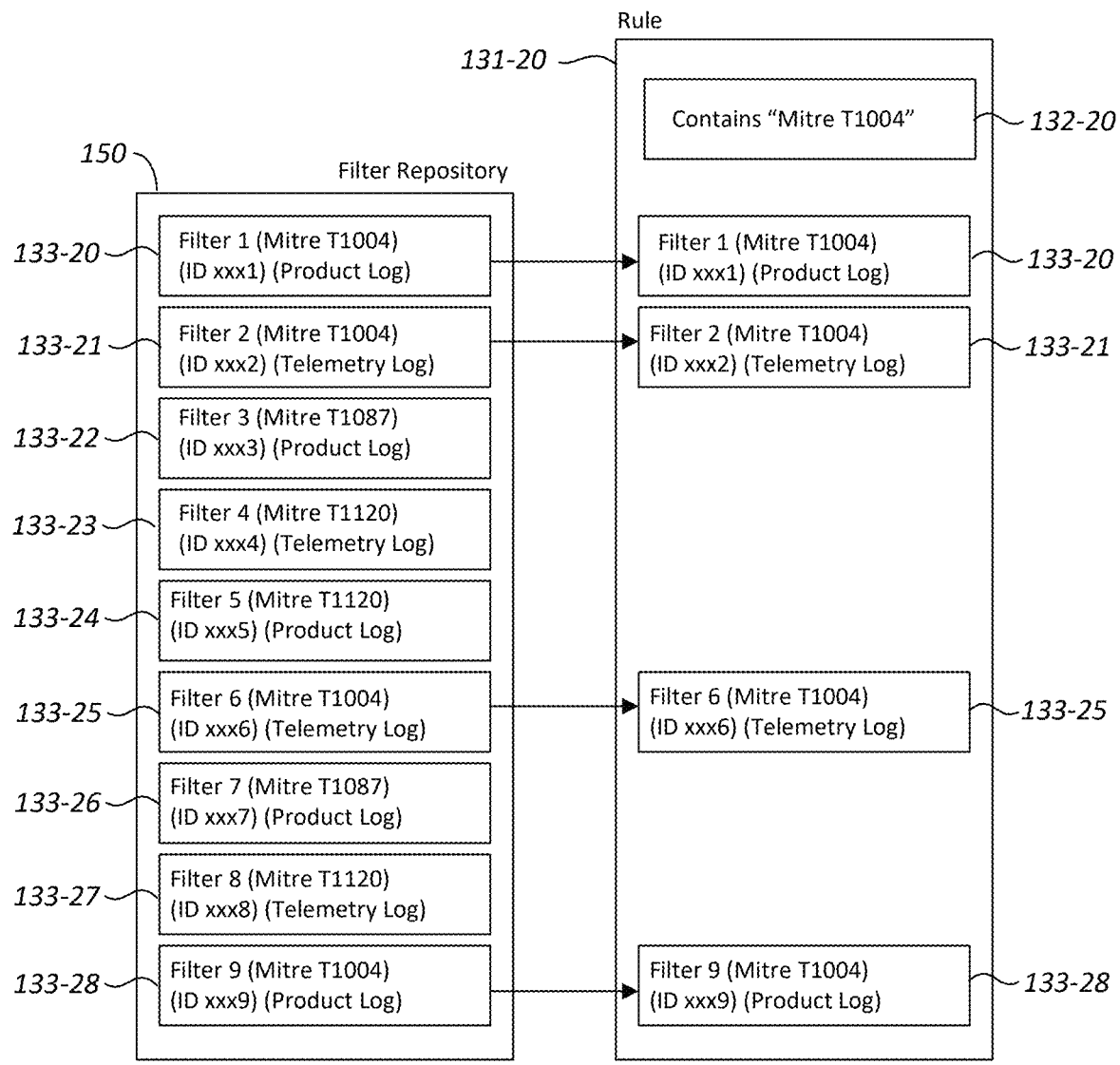
FIGS. 8-12 show block diagrams that illustrate use cases of heuristic models with rules, in accordance with embodiments of the present invention.

FIG. 8 shows a block diagram of a rule 131-20, in accordance with an embodiment of the present invention. The rule 131-20 includes a filter condition 132-20 for automatically including filters 133 in the rule 131-20. In the example of FIG. 8, the filter condition 132-20 indicates a filter 133 that contains the "Mitre T1004" tag. That is, any filter 133 with the tag "Mitre T1004" is automatically added to the rule 131-20. In the example of FIG. 8, the filter repository 150 includes filters 133-20 to 133-28. The filters 133-20, 133-21, 133-25, and 133-28 are automatically added to the rule 131-20 because they contain the static attribute "Mitre T1004" tag. The rule 131-20 is thus able to include all relevant filters, which pertain to the Mitre T1004 attack technique, even if the cybersecurity expert forgets or inadvertently misses a filter 133 that has the Mitre T1004 tag. As previously explained, any of the filters 133-20, 133-21, 133-25, and 133-28 is automatically removed from the rule 131-20 when it no longer has the Mitre T1004 tag. The heuristic model 130 that includes the rule 131-20 is thus automatically updated to include all relevant filters 133.

Figure 9:
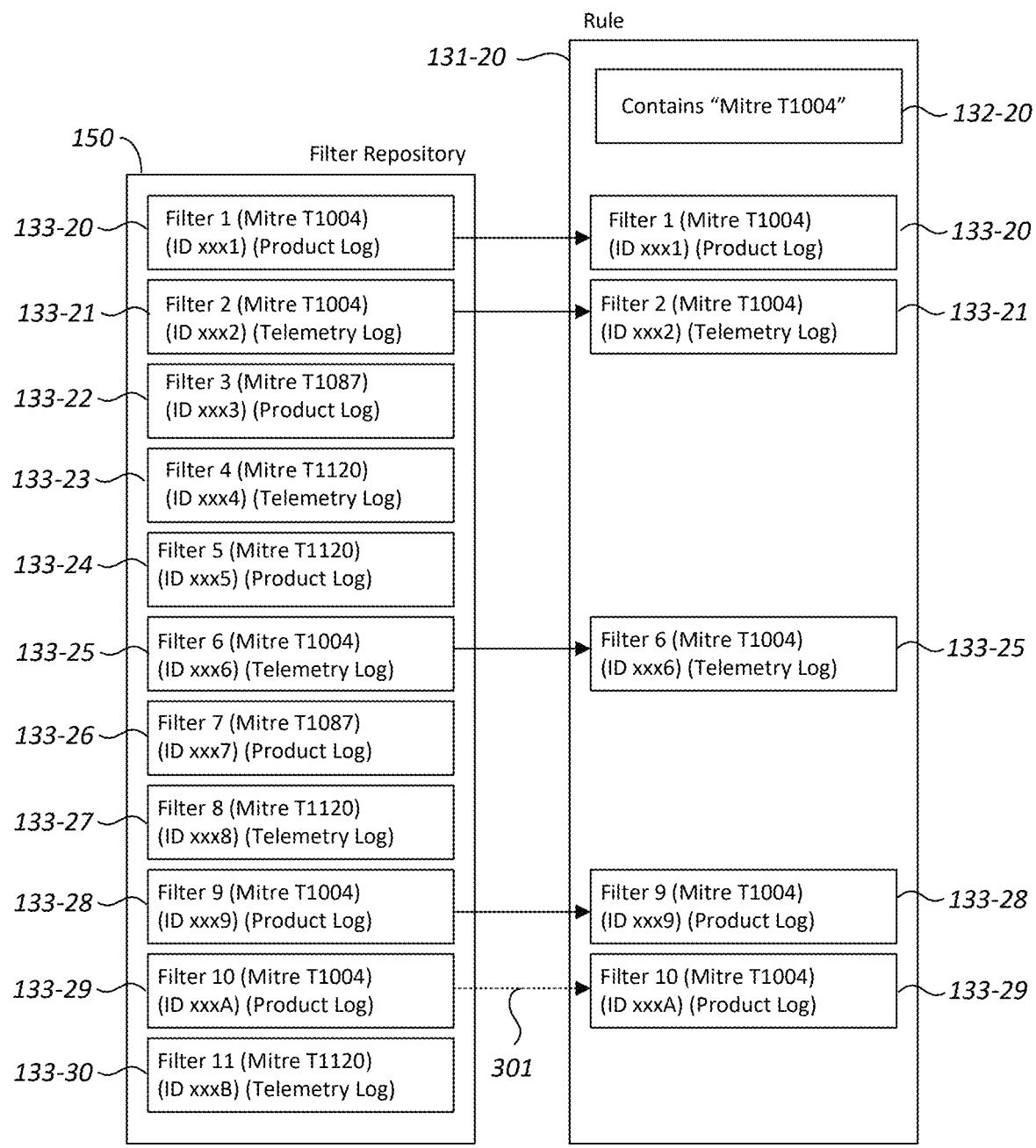

FIG. 9 shows a block diagram of the rule 131-20 after filters 133-29 and 133-30 have been added in the repository 150, in accordance with an embodiment of the present invention. Previously, the filter repository 150 only had the filters 133-20 to 133-28, with only the filters 133-20, 133-21, 133-25, and 133-28 meeting the requirements of the filter condition 132-20 as shown in FIG. 8. Because the filter condition 132-20 indicates automatically adding filters 133 that have the "Mitre T1004" tag, and the new filter 133-29 has the "Mitre T1004" tag, the rule 131-21 is automatically updated to include the new filter 133-29 as illustrated by a dotted arrow 301. The heuristic model 130 that includes the rule 131-20 is thus automatically updated to better detect a cyber threat as more filters for detecting attack techniques of the cyber threat are added to the repository 150.

Figure 10:
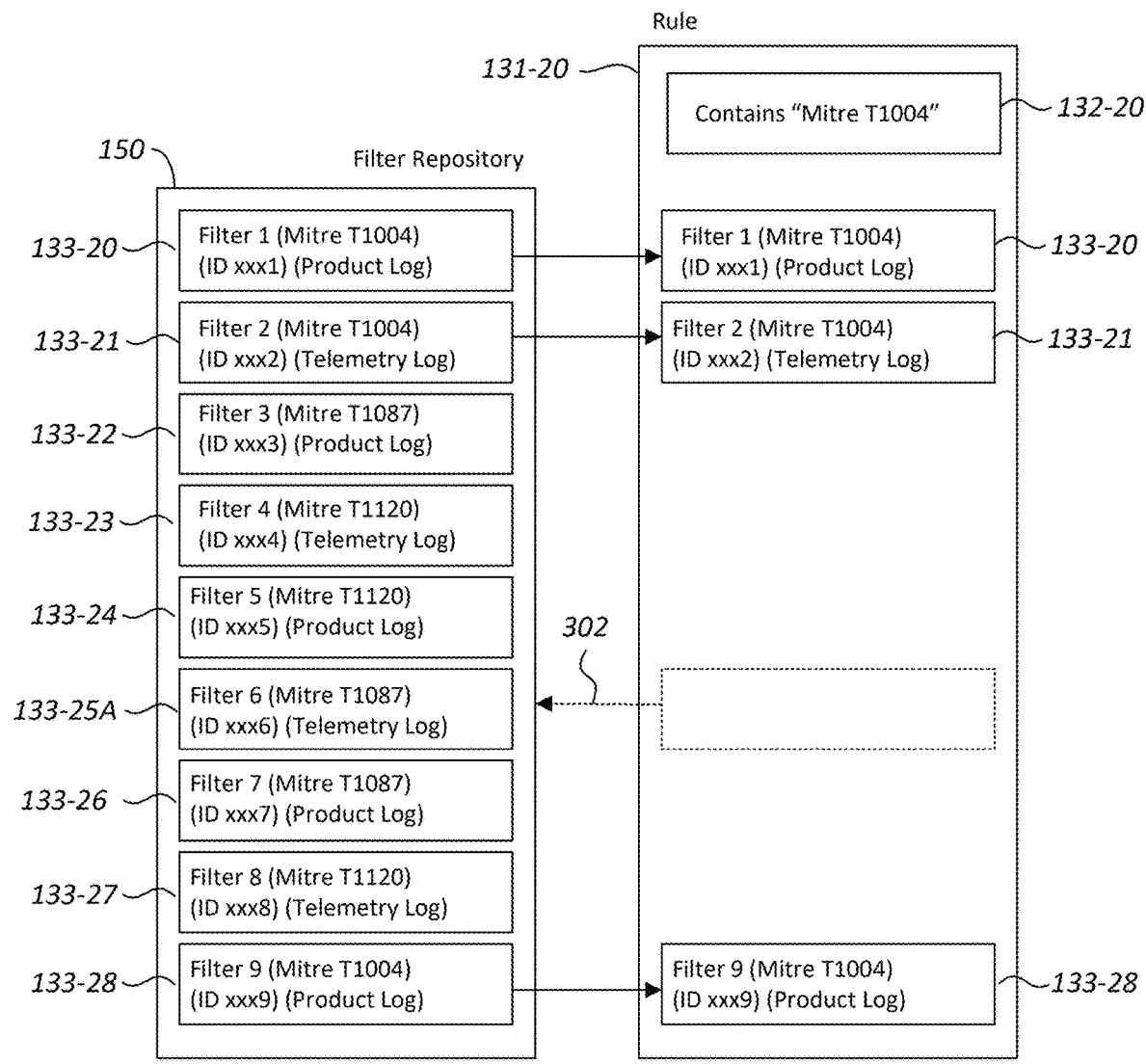

FIG. 10 shows a block diagram of the rule 131-20 after the filter 133-25 has been modified to the filter 133-25A, in accordance with an embodiment of the present invention. As before, the filter condition 132-20 indicates automatically adding filters 133 that have the "Mitre T1004" tag. The filter 133-25 previously met the "Mitre T1004" tag requirement of the filter condition 132-20 (see FIG. 8). However, the filter 133-25 has been modified to the filter 133-25A, which no longer has the "Mitre T1004" tag. Accordingly, the filter 133-25 is automatically removed from the rule 131-20, as illustrated by a dotted arrow 302. Advantageously, the heuristic model 130 that includes the rule 131-20 is automatically updated to remove filters that are no longer relevant as the filters are modified.

Figure 11:
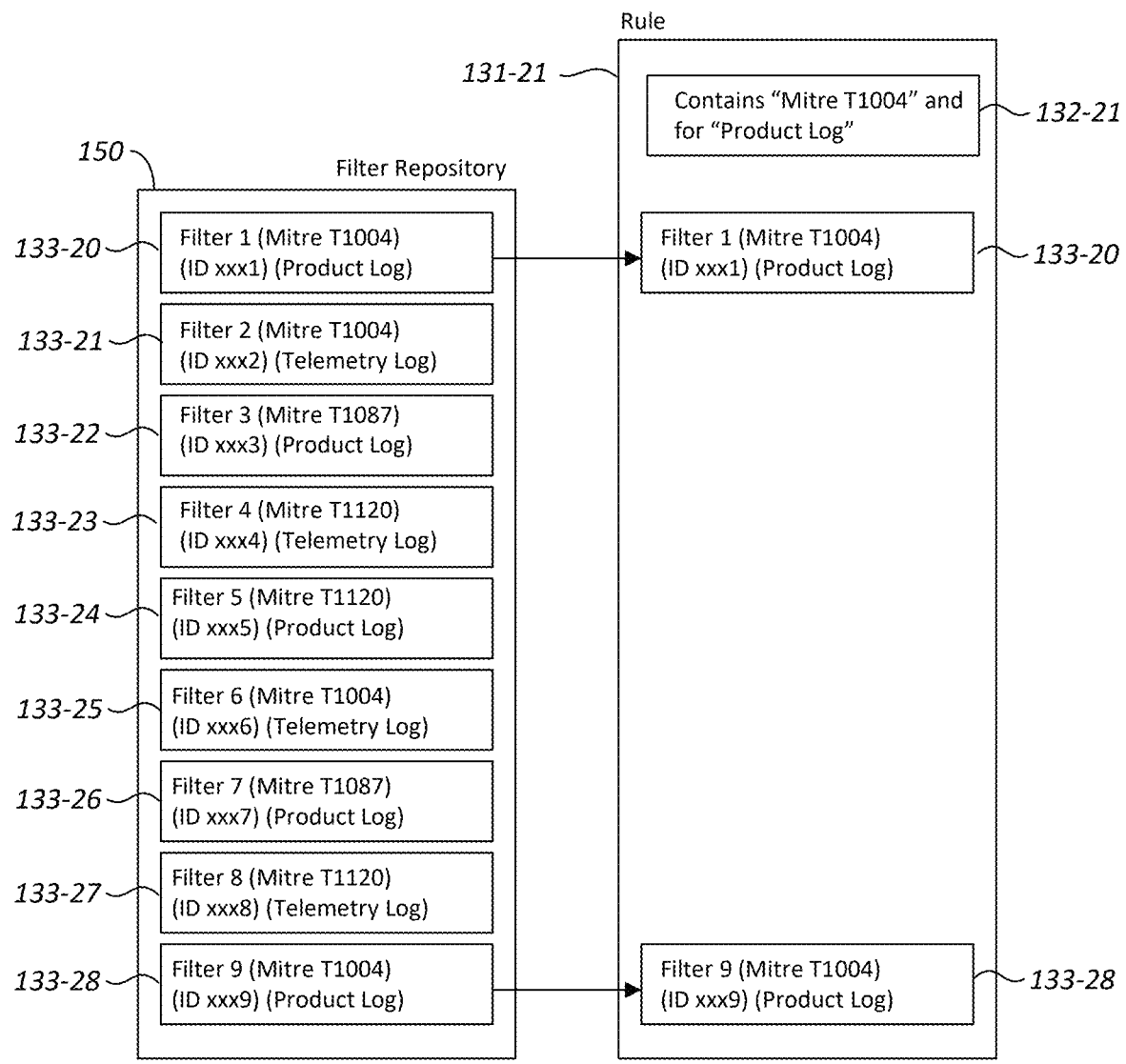

FIG. 11 shows a block diagram of a rule 131-21, in accordance with an embodiment of the present invention. The rule 131-21 includes a filter condition 132-21 for automatically including filters 133 in the rule 131-21. In the example of FIG. 11, the filter condition 132-21 indicates a filter 133 that contains the "Mitre T1004" tag and for scanning a "Product Log". The filter condition 132-21 is an example of having multiple requirements in a filter condition 132, allowing for selection of the most relevant filter. In the example of FIG. 11, the filter repository 150 includes filters 133-20 to 133-28. The filters 133-20 and 133-28 meet the tag and log source requirements of the filter condition 132-21, and are thus automatically added to the rule 131-21. The heuristic model 130 that includes the rule 131-21 is thus automatically updated to have the most relevant filters.

Figure 12:
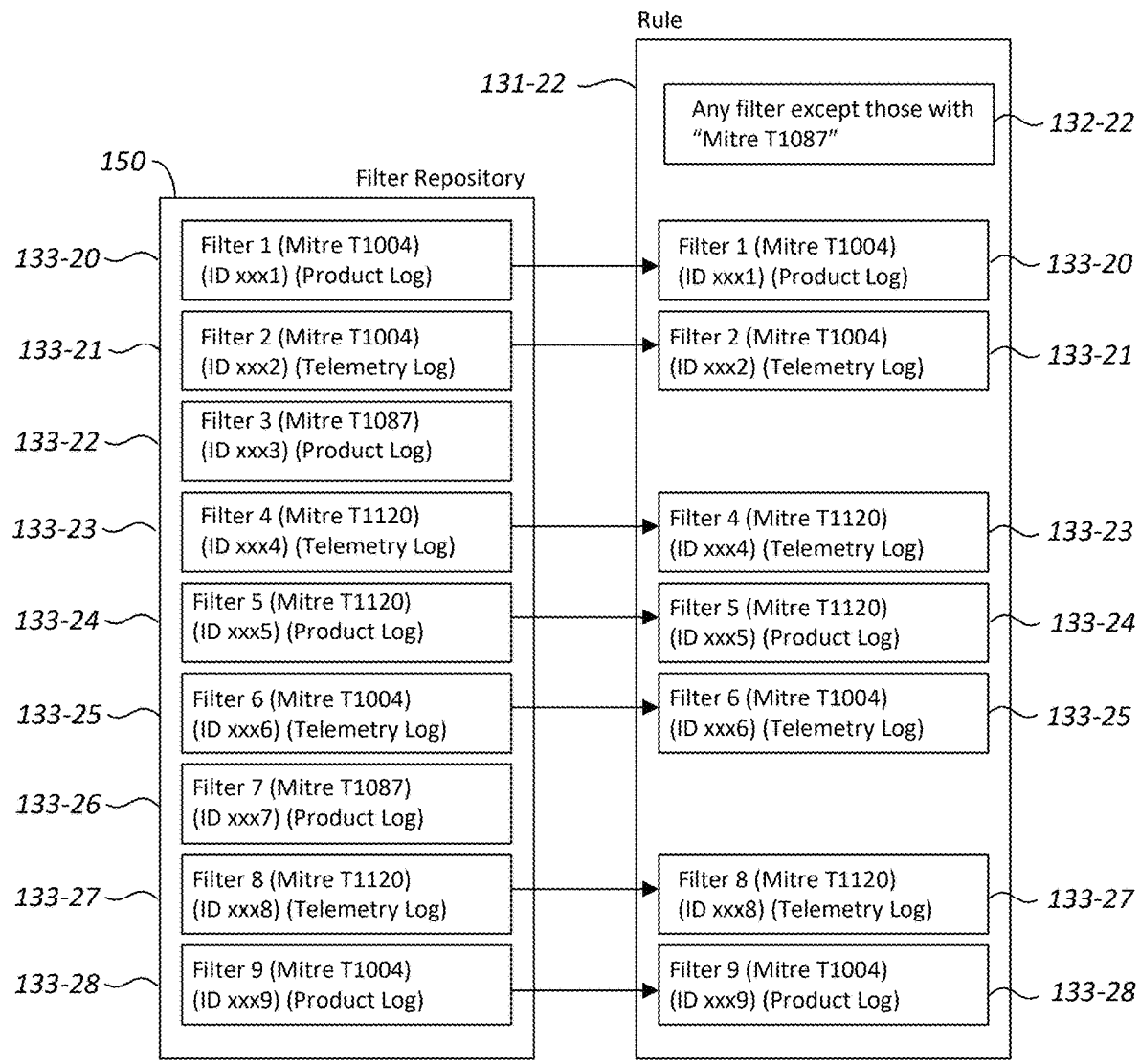

FIG. 12 shows a block diagram of a rule 131-22, in accordance with an embodiment of the present invention. The rule 131-22 includes a filter condition 132-22 for automatically including filters 133 in the rule 131-22. In the example of FIG. 12, the filter condition 132-22 indicates any filter except filters that have the "Mitre T1087" tag. The filter condition 132-22 is an example of having an exemption as a requirement in a filter condition, allowing for selection of a large number of relevant filters. Doing so manually would have been tedious and error-prone. In the example of FIG. 12, the filter repository 150 includes filters 133-20 to 133-28. The filters 133-20, 133-21, 133-23, 133-24, 133-25, 133-27, and 133-28 do not have the "Mitre T1087" tag, and are thus automatically added to the rule 131-22. The filters 133-22 and 133-26 have the "Mitre T1087" tag and are thus not automatically added in the rule 131-22. The heuristic model 130 that includes the rule 131-22 is thus automatically updated to include a large number of relevant filters.

Figure 13A:
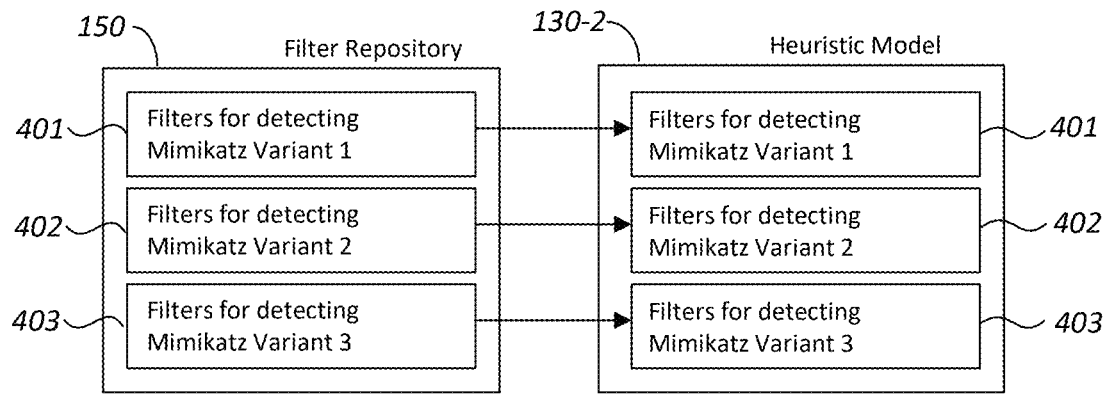
FIGS. 13A and 13B show block diagrams that illustrate how a heuristic model dynamically adapts to new variants of a cyber threat, in accordance with an embodiment of the present invention.
Figure 13B:
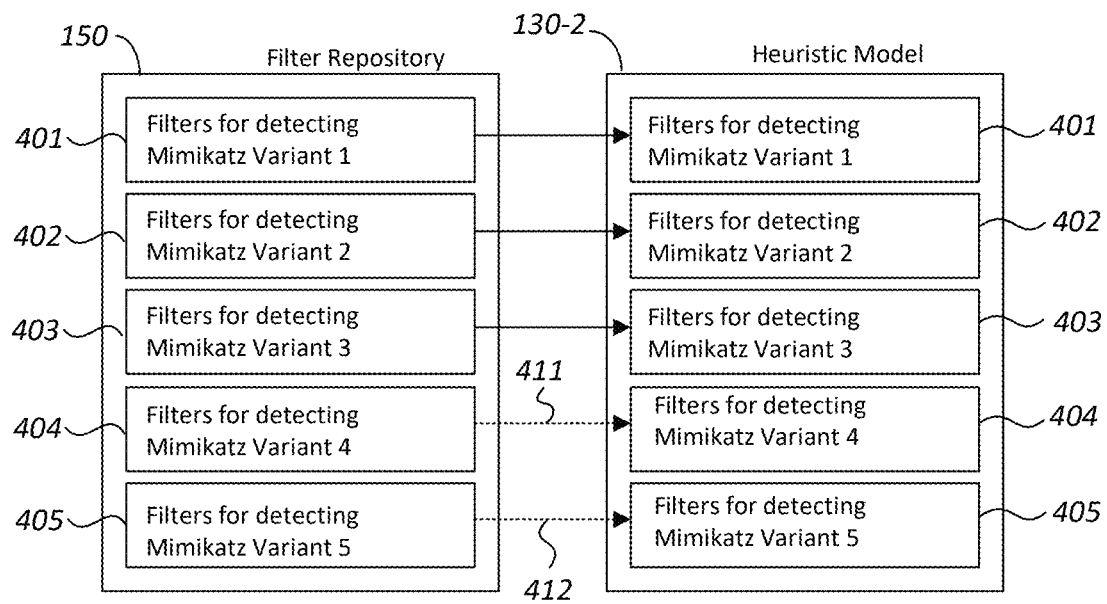

As can be appreciated, heuristic models in accordance with embodiments of the present invention may dynamically adapt to changing cyber threats. FIGS. 13A and 13B show block diagrams that illustrate how a heuristic model 130 dynamically adapts to new variants of a cyber threat, in accordance with an embodiment of the present invention.

Mimikatz is an open source malware program used by hackers and penetration testers to gather credentials on computers that run the Microsoft Windows™ operating system. In the example of FIG. 13A, the filter repository 150 includes a set 401 of filters for detecting a first variant of Mimikatz, a set 402 of filters for detecting a second variant of Mimikatz, and a set 403 of filters for detecting a third variant of Mimikatz. A heuristic model 130-2 for detecting Mimikatz and its variants incorporates the sets 401, 402, and 403 of filters in one or more rules (not shown) that include filter conditions.

Sometime after the heuristic model 130-2 has been deployed to scan security logs, fourth and fifth variants of Mimikatz have been detected in the wild and recorded in the security logs 140. In response, cybersecurity experts developed a set 404 of filters for detecting the fourth variant of Mimikatz and a set 405 of filters for detecting the fifth variant of Mimikatz. FIG. 13B shows the filter repository 150 after the sets 404 and 405 of filters have been added to the repository 150. By having suitable requirements in the filter conditions, these new sets 404 and 405 of filters are automatically incorporated in rules of the heuristic model 130-2 (FIG. 13B, dotted arrows 411 and 412) to detect the fourth and the fifth variants of Mimikatz. The heuristic model 130-2 is thus able to automatically keep up with new variants of Mimikatz.

Figure 14A:
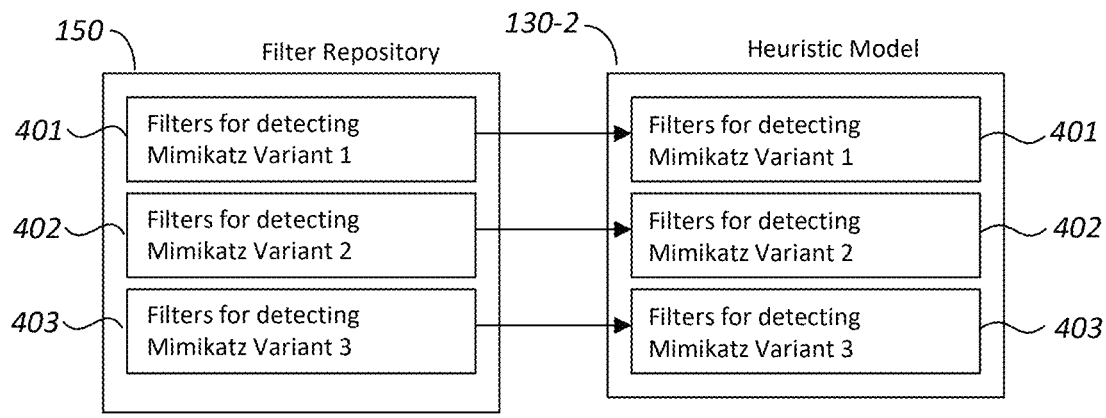
FIGS. 14A and 14B show block diagrams that illustrate how a heuristic model dynamically adapts to evolved variants of a cyber threat, in accordance with an embodiment of the present invention.
Figure 14B:
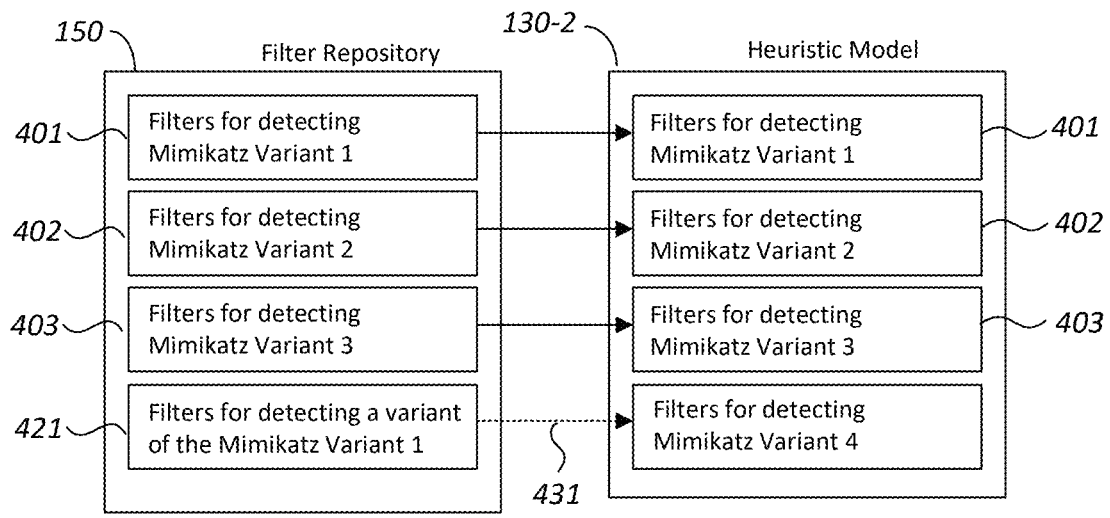

FIGS. 14A and 14B show block diagrams that illustrate how a heuristic model 130 dynamically adapts to evolved variants of a cyber threat, in accordance with an embodiment of the present invention.

In the example of FIG. 14A, the filter repository 150 includes the set 401 of filters for detecting the first variant of Mimikatz, the set 402 of filters for detecting the second variant of Mimikatz, and the set 403 for detecting the third variant of Mimikatz. The heuristic model 130-2 for detecting Mimikatz and its variants incorporates the sets 401, 402, and 403 of filters in one or more rules (not shown) that include filter conditions. At the time the heuristic model 130-2 is deployed with the sets 401, 402, and 403 of filters, only the first, second, and third variants of Mimikatz are known to cybersecurity experts.

Sometime after the heuristic model 130-2 has been deployed to scan security logs in the backend system 120, the first variant of Mimikatz has evolved into a different variant. The evolved first variant of Mimikatz has been detected in the wild and recorded in the security logs 140. In response, cybersecurity experts developed a set 421 of filters for detecting the evolved first variant of Mimikatz. FIG. 14B shows the filter repository 150 after the set 421 of filters have been added to the filter repository 150. By having suitable requirements in the filter conditions, this new set 421 of filters is automatically incorporated in rules of the heuristic model 130-2 (see dotted arrow 431) to detect the evolved first variant of Mimikatz. The heuristic model 130-2 is thus able to automatically keep up with variants of Mimikatz as the variants evolve over time.

Figure 15:
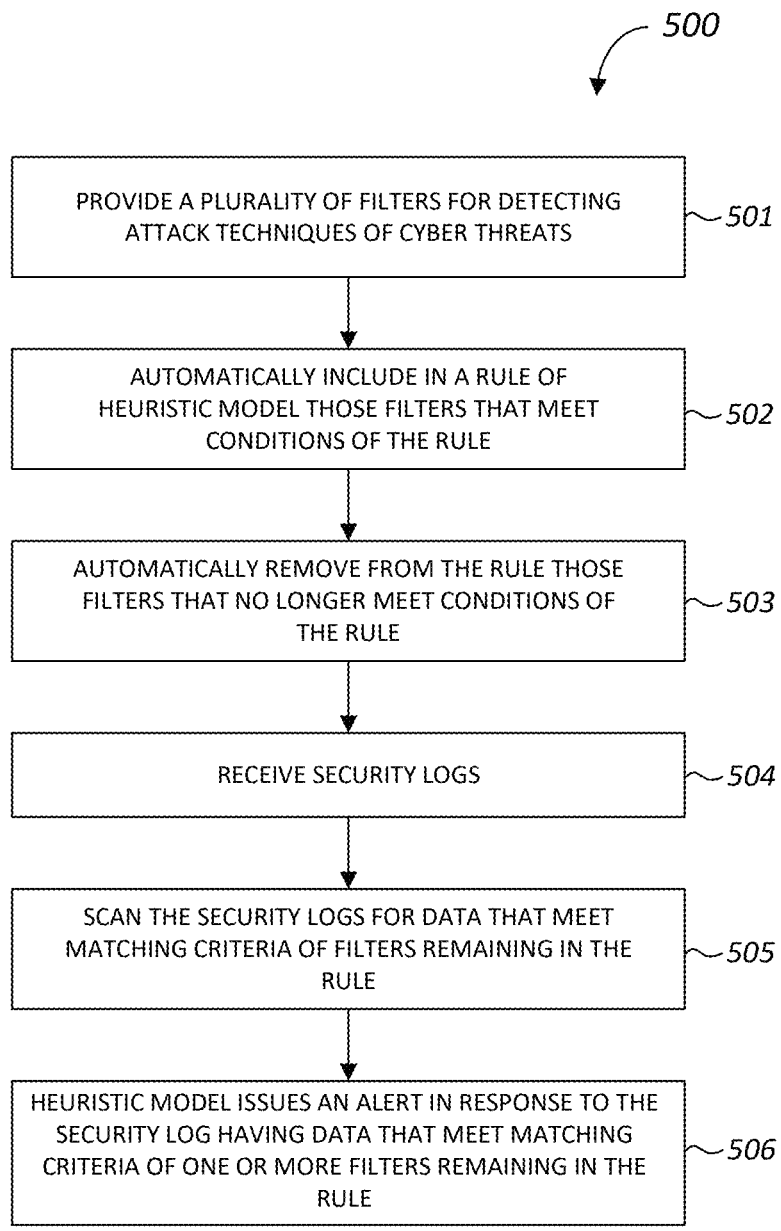
FIG. 15 shows a flow diagram of a method of scanning security logs for data indicative of cyber threats, in accordance with an embodiment of the present invention.

FIG. 15 shows a flow diagram of a method 500 of scanning security logs for data indicative of cyber threats, in accordance with an embodiment of the present invention. The method 500 is explained using previously discussed steps and components for illustration purposes. As can be appreciated, other steps and components may also be employed without detracting from the merits of the present invention.

In step 501, a plurality of filters for detecting attack techniques of cyber threats is provided. The filters include matching criteria that are used to detect data indicative of the attack techniques in security logs.

In step 502, filters of the plurality of filters that meet one or more conditions of a rule of a heuristic model for detecting a cyber threat are automatically included in the rule. The conditions of the rule may indicate static attributes or dynamic attributes of the filters. A filter meets a condition when the filter has a dynamic or static attribute required by the condition. Step 502 is performed for all filters that have conditions.

In step 503, filters that have been automatically included in a rule by meeting conditions of the rule are automatically removed from the rule when the filters no longer meet the conditions of the rule.

In step 504, security logs are received from a plurality of event sources.

In step 505, the security logs are scanned for data that meet the matching criteria of filters remaining in the rules of the heuristic model.

In step 506, the heuristic model issues an alert in response to a security log having data that match the matching criteria of one or more filters in the rule of the heuristic model.

Figure 16:
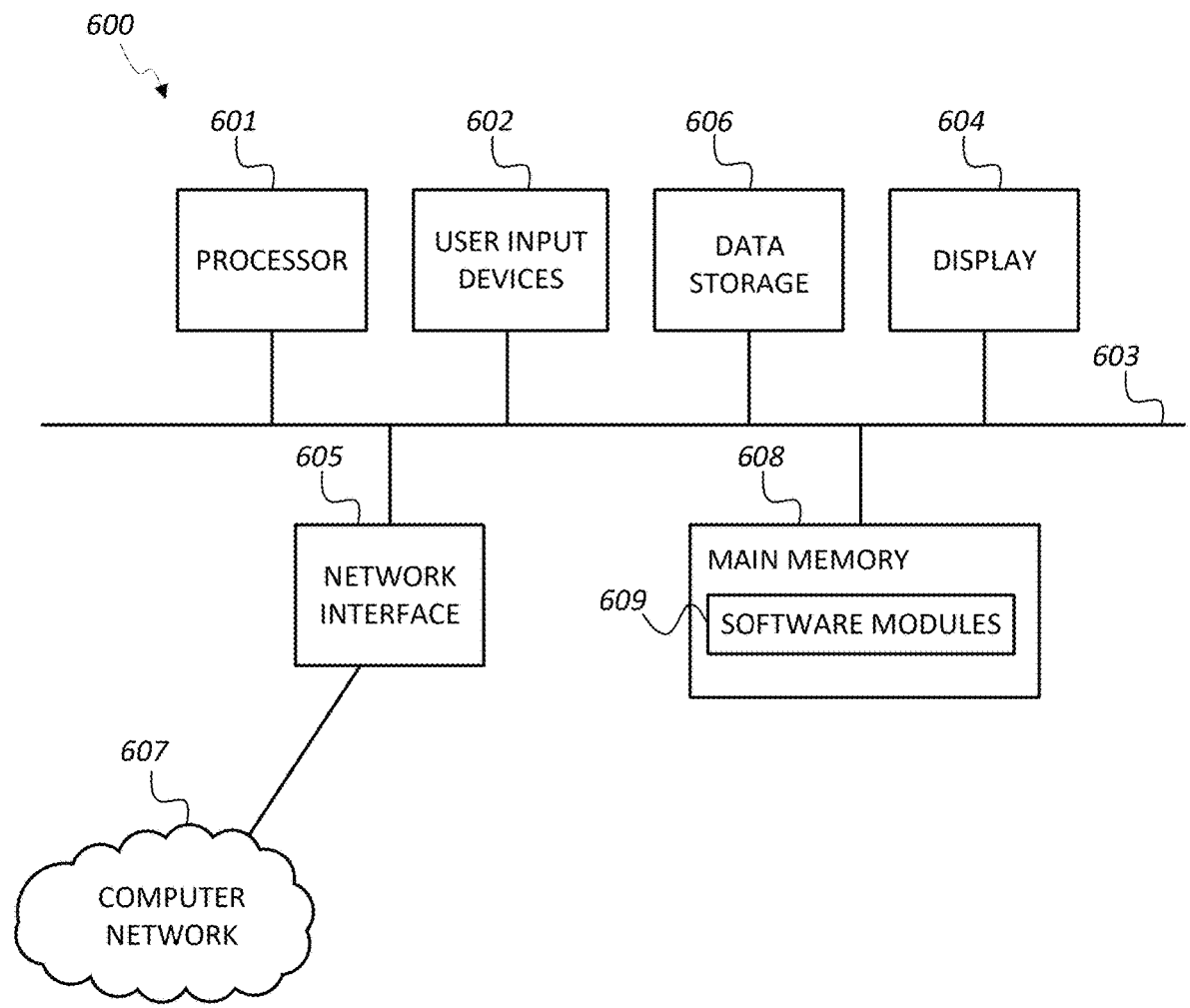
FIG. 16 shows a block diagram of a computer system that may be employed with embodiments of the present invention.

FIG. 16 shows a block diagram of a computer system 600 that may be employed with embodiments of the present invention. The computer system 600 may be employed as a backend system or other computer system described herein. The computer system 600 may have fewer or more components to meet the needs of a particular cybersecurity application. The computer system 600 may include one or more processors 601. The computer system 600 may have one or more buses 603 coupling its various components. The computer system 600 may include one or more user input devices 602 (e.g., keyboard, mouse), one or more data storage devices 606 (e.g., hard drive, optical disk, solid state drive), a display screen 604 (e.g., liquid crystal display, flat panel monitor), a computer network interface 605 (e.g., network adapter, modem), and a main memory 608 (e.g., random access memory). The computer network interface 605 may be coupled to a computer network 607, which in this example includes the public Internet.

The computer system 600 is a particular machine as programmed with one or more software modules 609, comprising instructions stored non-transitory in the main memory 608 for execution by at least one processor 601 to cause the computer system 600 to perform corresponding programmed steps. An article of manufacture may be embodied as computer-readable storage medium including instructions that when executed by at least one processor 601 cause the computer system 600 to be operable to perform the functions of the one or more software modules 609.

In one embodiment where the computer system 600 is configured as a backend system, the software modules 609 comprise instructions of a heuristic model and instructions for using the heuristic model to scan security logs to detect cyber threats.

While specific embodiments of the present invention have been provided, it is to be understood that these embodiments are for illustration purposes and not limiting. Many additional embodiments will be apparent to persons of ordinary skill in the art reading this disclosure

What is claimed is:

1. A method of scanning security logs for data indicative of cyber threats, the method comprising:

providing a plurality of filters in a filter repository, each of the plurality of filters comprising matching criteria that describe data indicative of an attack technique of a cyber threat;

automatically including a first filter of the plurality of filters in a rule of a heuristic model for detecting a particular cyber threat, the rule including a first filter condition for automatically adding filters from the filter repository into a subset of the plurality of filters that are included in the rule, wherein the first filter is automatically added to the subset of the plurality of filters in response to the first filter having an attribute that is indicated by the first filter condition of the rule;

scanning a security log for data that are described by matching criteria of the subset of the plurality of filters; and the heuristic model issuing an alert at least in response to detecting that the security log includes data that are described by matching criteria of the first filter.

2. The method of claim 1, further comprising:

automatically removing the first filter from the rule in response to the first filter no longer having the attribute.

3. The method of claim 2, further comprising:

automatically including a second filter of the plurality of filters in the subset of the plurality of filters in response to the second filter having an attribute that is indicated by a second filter condition for automatically adding filters from the filter repository into the subset of the plurality of filters; and scanning the security log for data that are described by matching criteria of the second filter.

4. The method of claim 3, wherein the heuristic model issues the alert in response to detecting that the security log includes data that are described by the matching criteria of the first filter and the matching criteria of the second filter.

5. The method of claim 3, wherein the heuristic model issues the alert in response to detecting that the security log includes data that are described by the matching criteria of the first filter or the matching criteria of the second filter.

6. The method of claim 1, wherein the first filter condition of the rule indicates a static attribute.

7. The method of claim 6, wherein the static attribute is a tag that is included in the first filter.

8. The method of claim 1, wherein the first filter condition of the rule indicates a dynamic attribute.

9. The method of claim 8, wherein the dynamic attribute is prevalence of the first filter.

10. A backend system for scanning security logs to detect data indicative of cyber threats, the backend system comprising at least one processor and a memory, the memory storing instructions that when executed by the at least one processor cause the backend system to:

store a plurality of filters in a filter repository, each of the plurality of filters describing an attack technique of a cyber threat;

automatically include a first filter of the plurality of filters in a rule of a heuristic model for detecting a particular cyber threat in response to the first filter having an attribute that is indicated by a first filter condition of the rule, wherein the first filter condition is for automatically including filters from the filter repository into a subset of the plurality of filters that are included in the rule;

automatically include a second filter of the plurality of filters in the rule in response to the second filter having an attribute that is indicated by a second filter condition of the rule, wherein the second filter condition is for automatically including filters from the filter repository into the subset of the plurality of filters;

receive the security logs from a plurality of security event sources;

scan the security logs for data that are described by the first filter and the second filter; and issue an alert based at least on a security log including data that are described by the first filter as indicative of an attack technique of a cyber threat.

11. The backend system of claim 10, wherein the instructions stored in the memory when executed by the at least one processor cause the backend system to issue the alert based at least on the security log including data that are described by the first filter and the second filter as indicative of attack techniques of cyber threats.

12. The backend system of claim 10, wherein the first filter condition indicates a static attribute and the attribute of the first filter is the static attribute.

13. The backend system of claim 10, wherein the first filter condition indicates a dynamic attribute, and the attribute of the first filter is the dynamic attribute.

14. The backend system of claim 10, wherein the instructions stored in the memory when executed by the at least one processor cause the backend system to:

automatically remove the first filter from the rule in response to the first filter no longer having the attribute.

* * * * *